(12) United States Patent
Nagao

(10) Patent No.: US 10,673,976 B2
(45) Date of Patent: Jun. 2, 2020

(54) CONNECTED DEVICE PROCESSING SYSTEMS AND METHODS

(71) Applicant: Intertrust Technologies Corporation, Sunnyvale, CA (US)

(72) Inventor: Yutaka Nagao, Cupertino, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 77 days.

(21) Appl. No.: 15/450,815

(22) Filed: Mar. 6, 2017

(65) Prior Publication Data
US 2017/0257322 A1 Sep. 7, 2017

Related U.S. Application Data

(60) Provisional application No. 62/304,831, filed on Mar. 7, 2016.

(51) Int. Cl.
| | |
|---|---|
| *G06F 15/173* | (2006.01) |
| *H04L 29/08* | (2006.01) |
| *H04L 29/06* | (2006.01) |
| *G06F 9/50* | (2006.01) |
| *G06F 21/62* | (2013.01) |

(Continued)

(52) U.S. Cl.
CPC .......... *H04L 67/303* (2013.01); *G06F 9/5061* (2013.01); *G06F 21/57* (2013.01); *G06F 21/6218* (2013.01); *H04L 63/0823* (2013.01); *H04L 67/12* (2013.01); *H04L 47/783* (2013.01); *H04L 47/827* (2013.01); *H04L 67/10* (2013.01); *H04L 67/2838* (2013.01)

(58) Field of Classification Search
CPC ....... H04L 47/70; H04L 67/12; H04L 47/827; H04L 67/303; H04L 63/0823; H04L 67/2838; H04L 47/783; H04L 67/10; G06F 9/5061; G06F 21/6218; G06F 21/57

See application file for complete search history.

(56) References Cited

U.S. PATENT DOCUMENTS

| | | | | |
|---|---|---|---|---|
| 2008/0320482 A1* | 12/2008 | Dawson | ................ | G06F 9/5027 718/104 |
| 2012/0159506 A1* | 6/2012 | Barham | ................ | G06F 9/5044 718/104 |

(Continued)

FOREIGN PATENT DOCUMENTS

| | | | | |
|---|---|---|---|---|
| WO | WO-2017018928 A1 * | 2/2017 | ......... | G06Q 20/3678 |

*Primary Examiner* — Cheikh T Ndiaye
(74) *Attorney, Agent, or Firm* — Finnegan, Henderson, Farabow, Garrett & Dunner, LLP

(57) ABSTRACT

This disclosure relates to systems and methods for using available computational resources of a variety of connected devices in a connected device ecosystem in connection with performing various computational and/or processing operations. In certain embodiments, computational and/or processing operations may be distributed between a plurality of connected devices by a trusted service, leveraging available computational resources of the connected devices to perform relatively complex computations and/or operations. Systems and methods are further disclosed that allow for enforcement of various policies in connection with such distributed computation and/or processing operations, which may help to protect the privacy and security interests of various stakeholders in the connected device ecosystem.

15 Claims, 6 Drawing Sheets

(51) Int. Cl.
*G06F 21/57* (2013.01)
*H04L 12/911* (2013.01)

(56) References Cited

U.S. PATENT DOCUMENTS

| | | | | |
|---|---|---|---|---|
| 2014/0237482 A1* | 8/2014 | Garvey | ............... | G06F 9/505 |
| | | | | 718/105 |
| 2014/0325545 A1* | 10/2014 | Willis | ............. | H04N 21/44204 |
| | | | | 725/14 |
| 2014/0354187 A1* | 12/2014 | Aggarwal | ......... | H05B 37/0245 |
| | | | | 315/312 |
| 2015/0020132 A1* | 1/2015 | Willis | ................... | H04L 47/76 |
| | | | | 725/110 |

* cited by examiner

CONNECTED DEVICE PROCESSING SYSTEMS AND METHODS

RELATED APPLICATIONS

This application claims the benefit of priority under 35 U.S.C. § 119(e) to U.S. Provisional Application No. 62/304,831, filed Mar. 7, 2016, and entitled "CONNECTED DEVICE PROCESSING SYSTEMS AND METHODS," which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to connected devices. More specifically, but not exclusively, the present disclosure relates to systems and methods for facilitating processing operations using a variety of connected devices.

Connected devices have become an important part of our lives. As the use of the Internet is increasingly intrinsic to people's daily activities, more personal electronic devices are becoming interconnected. A variety of Internet-connected devices are now available to consumers as part of a connected-device ecosystem that utilizes the existing Internet infrastructure called the Internet of Things ("IoT"). The IoT provides connectivity that makes a variety of computing devices (i.e., things) and groups of devices more useful. The IoT may also allow for the collection of unprecedented amounts of data relating to a user, thereby facilitating an understanding of a user's environment, behavior, and/or how well various devices associated with the user perform. The IoT may further allow for control and/or automation of various devices, thereby improving the interaction between and/or functionality of a user's devices.

Many connected devices included in the IoT may remain powered for relatively prolonged periods of time. For example, a smartphone, a connected smoke detector, and/or a connected appliance may generally be switched to and/or remain in a continually-powered and/or powered standby state. Connected devices may also include computational and processing resources that may exceed the typical processing demands of the devices. For example, a connected thermostat may, with the exception of certain relatively short peak usage periods (e.g., when issuing commands and/or the like), generally remain in an idle mode and/or not use the full capabilities of its available computation and/or processing resources.

Systems and methods disclosed herein may use available computational resources of a variety of connected devices in the IoT in connection with performing various computational and/or processing operations. In some embodiments, computational and processing operations may be distributed in nature, leveraging available computational resources in a network of connected devices to perform more complex computations and/or operations. In certain embodiments, distributed computational and/or processing operations may be coordinated, at least in part, by a trusted service in communication with the connected devices.

The disclosed systems and methods may be used in connection with a variety of connected devices or "things". As used herein, the terms device, connected device, system, and/or thing may, in certain instances, be used interchangeably. In certain embodiments, the systems and methods may be used in connection with a personal IoT ecosystem associated with a particular user and/or a group of users. Embodiments of the disclosed systems and methods maybe implemented in connection with a diverse ecosystem of connected devices associated with a user, their home, their vehicle, their workplace, and/or the like. For example, embodiments of the disclosed systems and methods may be used in connection with connected devices including security systems, networked locks, thermostats, heating, ventilating, and air conditioning ("HVAC") systems, irrigation systems, water controls, pumps, heaters, home utility meters, home network gateways, activity sensors, alarms (e.g., fire and/or $CO_2$ alarms), connected home appliances (e.g., refrigerators, washing machines, televisions, etc.), connected vehicles, mobile communication devices, computing devices, and/or any other connected device, as well as associated data stores. Embodiments may further be extended for use in connection with other connected devices including medical and/or personal devices such as activity and/or fitness monitoring devices, pacemakers, insulin pumps, blood sugar monitors, and/or the like.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Systems and methods are presented facilitating performance of computational and/or processing operations by a variety of connected devices in a connected device ecosystem such as an IoT ecosystem. In certain embodiments, the systems and methods described herein can, for example, be used in connection with digital rights management ("DRM") technologies such as those described in commonly assigned, co-pending U.S. patent application Ser. No. 11/583,693 ("the '693 application"), service orchestration technologies such as those described in commonly assigned co-pending U.S. patent application Ser. No. 10/863,551 ("the '551 application"), genetic information storage and/or management technologies such as those described in commonly assigned co-pending U.S. patent application Ser. No. 13/654,349 ("the '349 application"), and/or content delivery technologies such as those described in commonly assigned co-pending U.S. patent application Ser. No. 12/785,406 ("the '406 application") (the contents of '693 application, the '551 application, the '349 application, and the '406 application hereby being incorporated by reference in their entireties), as well as in other contexts. It will be appreciated that these systems and methods are novel, as are many of the components, systems, and methods employed therein.

Figure 1:
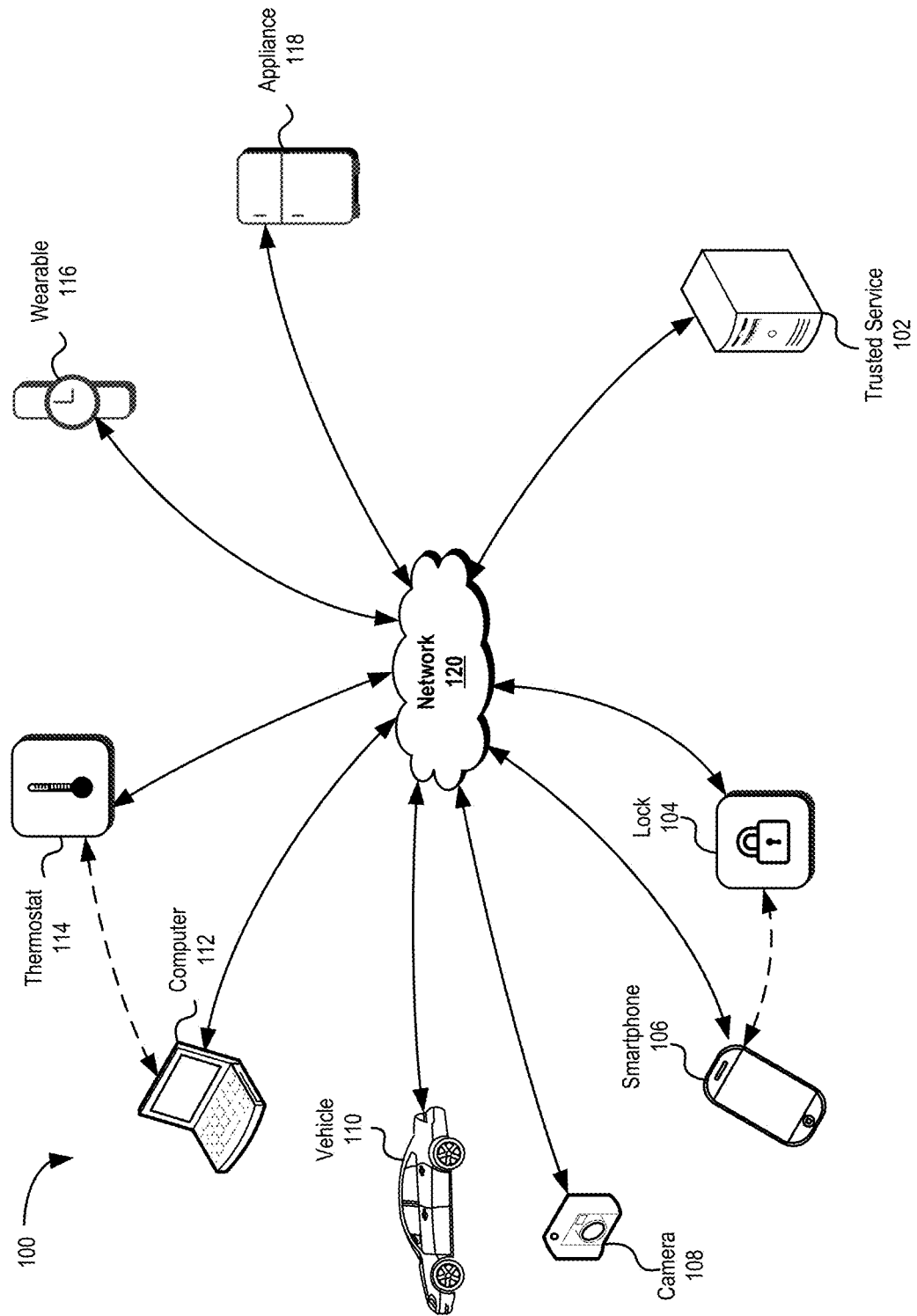
FIG. 1 illustrates an exemplary connected device ecosystem consistent with embodiments of the present disclosure.

FIG. 1 illustrates an exemplary connected device ecosystem 100 consistent with embodiments of the present disclosure. A variety of connected systems and/or devices 102-118 may be communicatively coupled via a network 120 to form the connected device ecosystem 100. The systems and/or devices 102-118 may be associated with a user, a group of users, a location, an entity and/or organization, one or more service providers (e.g., one or more third-party service providers and/or the like), and/or any combination of the same.

The systems and/or devices 102-118 may comprise any suitable computing system or systems configured to implement embodiments of the systems and methods disclosed herein. In certain embodiments, the systems and/or devices 102-118 may comprise at least one processor system configured to execute instructions stored on an associated non-transitory computer-readable storage medium. As discussed in more detail below, the systems and/or devices 102-118 may further comprise a secure processing unit ("SPU") configured to perform sensitive operations such as trusted signature operations, credential and/or key management, secure policy management, and/or other aspects of the systems and methods disclosed herein. The systems and/or devices 102-118 may further comprise software and/or hardware configured to enable electronic communication of information between the devices and/or systems 102-118 via one or more associated network connections of the network 120.

Systems and/or devices included in the connected device ecosystem 100 may include, without limitation, a smartphone 106, a wireless communication device (e.g., a cellular telephone, a pager, etc.), a desktop and/or laptop computer system 112, a wearable computing device 116 (e.g., a smartwatch, an activity and/or fitness monitoring device, etc.), a connected vehicle 110 and/or systems associated with the same (e.g., a passenger vehicle, aircraft, boat, train, and/or telematics and/or infotainment systems associated with the same, etc.), a home automation and/or security system and/or components associated with the same (e.g., security keypads, networked locks 104, gate and/or other access control devices, connected lighting, etc.), connected thermostats 114, HVAC systems, irrigation systems, water control systems, pumps, heaters, home utility meters, home network gateways, activity sensors, alarms (e.g., fire and/or $CO_2$ alarms), a tablet computer, wireless control devices (e.g., keyless entry or remote start devices, etc.), gaming or other entertainment devices, connected home appliances 118 (e.g., refrigerators, washing machines, ranges, toasters, etc.), consumer electronic devices (e.g., a bathroom scale, a digital camera 108, speaker systems, televisions, etc.), medical devices (e.g., pacemakers, insulin pumps, blood sugar monitors, etc.), and/or any other computing system and/or device as well as associated data stores.

The connected device ecosystem 100 may further include one or more service provider systems (not shown). In certain embodiments, the one or more service provider systems may communicate with a variety of systems and/or devices 102-118 included in the connected device ecosystem 100. In some embodiments, the one or more service provider systems may provide information to and/or receive information from the systems and/or devices 102-118 (e.g., data collected by the systems and/or devices 102-118, control information for controlling the function and/or operation of the systems and/or devices 102-118, etc.). For example, a user may use a smartphone 106 to interface with a service provider system associated with a home security company via a network 120 to control the state of a networked lock 104 associated with their home security system. The user may further view information relating to a status and/or state of the networked lock 104 from the service provider system.

The systems and/or devices 102-118 may be communicatively coupled via one or more network connections of a network 120. For example, as discussed above, a user may remotely communicate with a networked lock 104 and/or an associated service provider system (not shown) using a smartphone 106 via one or more network connections included in the network 120. In further embodiments, systems and/or devices 102-118 in the connected device ecosystem 100 may directly communicate without the use of any intermediate network connections (e.g., via a proximal field communication channel and/or the like). For example, as illustrated, a user may communicate with a networked lock 104 directly using a smartphone 106 and/or communicate with a connected thermostat 114 directly using a laptop computer system 112.

The network connections may comprise a variety of network communication devices and/or channels and may utilize any suitable communications protocols and/or standards facilitating communication between the connected devices and systems. The network connections may comprise the Internet, a local area network, a virtual private network, and/or any other communication network or combination of networks utilizing one or more electronic communication technologies and/or standards (e.g., Ethernet or the like). The network connections may utilize multiplexers, routers, hubs, gateways, firewalls, switches and/or any other network communication devices and/or systems to facilitate communications on the networks. In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections 100 may incorporate one or more satellite communication links. In yet further embodiments, the network connections may utilize IEEE's 902.11 standards, Bluetooth®, ultra-wide band ("UWB"), Zigbee®, and or any other suitable standard or standards.

In certain embodiments, distributed computational and/or processing operations may be coordinated, at least in part, by a trusted service 102 in communication with the various connected devices 104-118 in the connected device ecosystem 100. As described in more detail below, the trusted service 102 may, among other things, generate computation modules and/or distribute such modules to one or more connected devices 104-118 that may enable the connected devices 104-118 to engage in various aspects of distributed computational and/or processing operations, issue requests to one or more connected devices 104-118 to perform one or more computations and/or processing operations and/or aspects thereof, and/or receive associated results from the one or more connected devices 104-118.

It will be appreciated that a number of variations can be made to the architecture, relationships, and examples presented in connection with FIG. 1 within the scope of the inventive body of work. For example, certain device and/or system functionalities described above may be integrated into a single device and/or system and/or any suitable combination of devices and/or systems in any suitable configuration. Thus it will be appreciated that the architecture, relationships, and examples presented in connection with FIG. 1 are provided for purposes of illustration and explanation, and not limitation.

Figure 2:
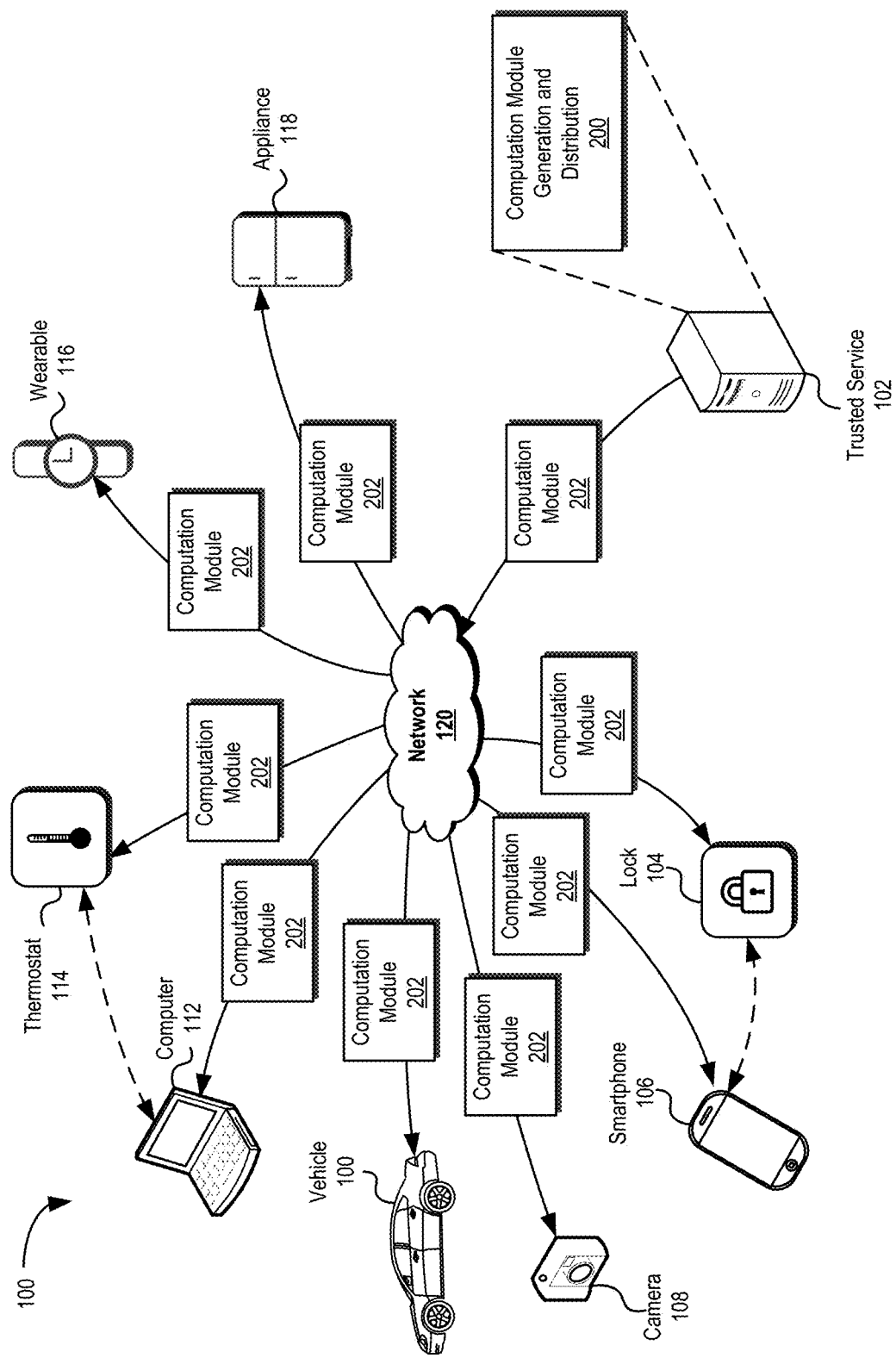
FIG. 2 illustrates distribution of a computational module in a connected device ecosystem consistent with embodiments of the present disclosure.

FIG. 2 illustrates distribution of computational modules in a connected device ecosystem 100 consistent with embodiments of the present disclosure. In certain embodiments, a trusted service 102 may generate and/or distribute one or more computation modules 202 to one or more connected devices 104-118 in the connected device ecosystem 100. The computation modules 202 may comprise an executable application that, when installed on a connected device 104-118, may generate and communicate status, availability, and/or other device information to the trusted service 102, receive requests to perform computations and/or other processing operations from the trusted service 102, schedule and/or perform such computations and/or operations (e.g., during periods when a connected device 104-118 is in an idle state, a standby state, etc.), generate and/or communicate results of the computations and/or operations to the trusted service 102, and/or the like. In some embodiments, generation and/or distribution of computation modules 202 may be managed by a computation module generation and distribution engine 200 executed by the trusted service 102.

In some embodiments, rather than being generated by the trusted service 102 and/or distributed to the connected devices 104-118 from the trusted service 102, computational modules 202 may be included in software associated with the connected devices 104-118 at the time of manufacture. For example, the connected devices 104-118 may be manufactured to include a computation module 202 configured to interface with the trusted service 102 in connection with implementing embodiments of the disclosed systems and methods. In further embodiments, the computation modules 202 may be distributed to the connected devices 104-118 via one or more application stores. Computation modules 202 installed on the connected devices 104-118 may be updated by the trusted service 102 and/or any other service as may be desired.

Figure 3:
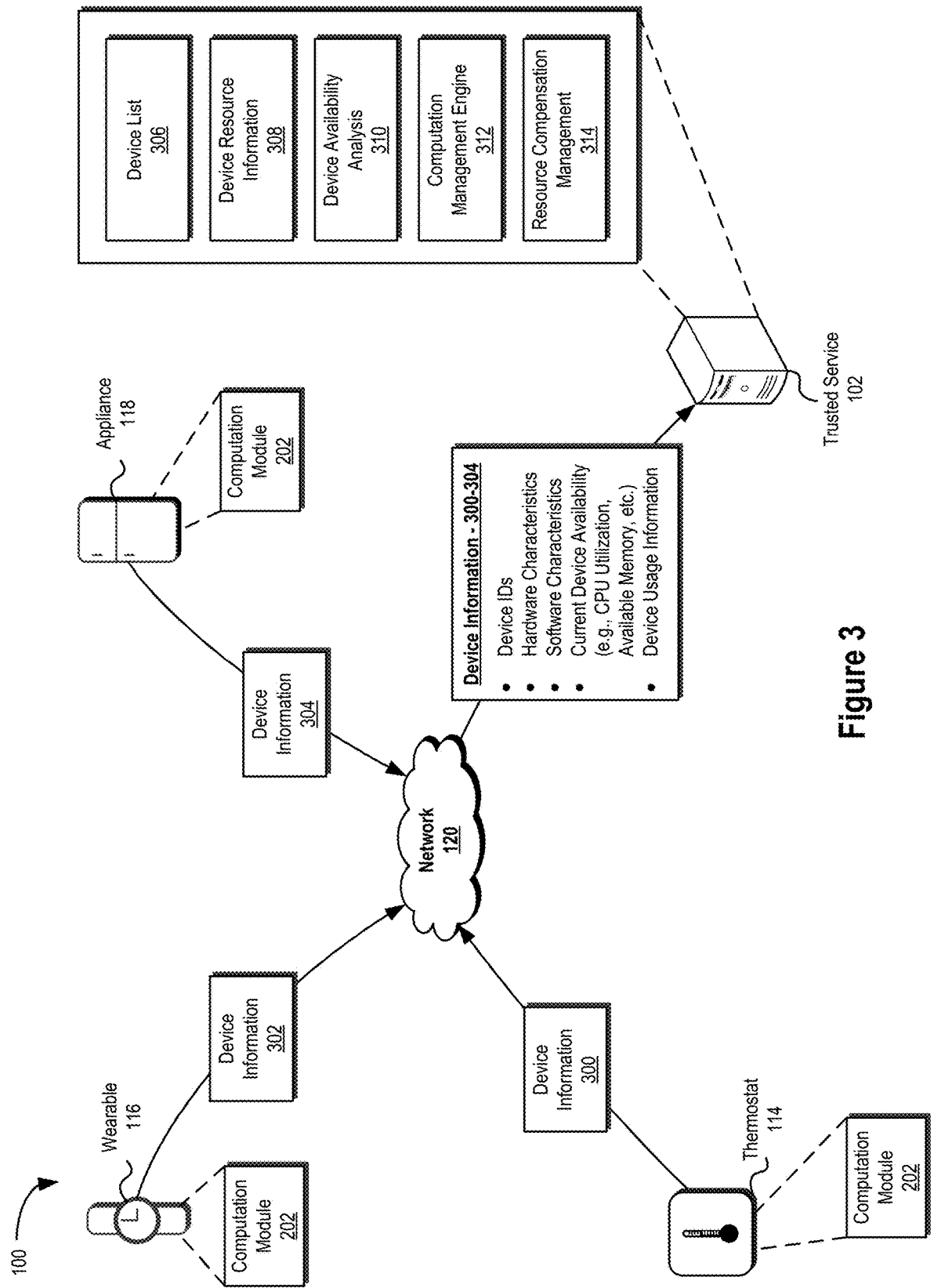
FIG. 3 illustrates communication of device information to a trusted service in a connected device ecosystem consistent with embodiments of the present disclosure.

FIG. 3 illustrates communication of device information 300-304 to a trusted service 102 in a connected device ecosystem 100 consistent with embodiments of the present disclosure. In certain embodiments, computation modules 202 executing on various connected devices 114-118 may generate and/or communicate certain status and/or device information 300-304 to the trusted service 102 via the network 120. The device information 300-304 may comprise a variety of information. In some embodiments, the device information 300-304 may comprise one or more identifiers and/or descriptions of the associated devices 114-118. In certain embodiments, the device identifiers may comprise information specified by users of the devices 114-118 (e.g., user specified descriptions of the devices 114-118—"Living Room Thermostat," "Alice's Watch," "Upstairs Refrigerator," and/or the like.). In further embodiments, the device identifiers may comprise information randomly generated by and/or otherwise assigned to the devices 114-118 (e.g., random device IDs such as a MAC ID and/or the like). In yet further embodiments, the device identifiers may comprise information identifying a network identity of the devices 114-118 (e.g., device IP addresses and/or the like).

In some embodiments, the device identifiers may comprise information that may be used to personally identify associated users of the devices 114-118. In further embodiments, device identifiers may comprise information that may not personally identify associated users of the devices 114-118. In some embodiments, prior to transmission of the device identifiers to the trusted service 102, the devices 114-118 may filter and/or anonymize the identifiers and/or any other aspects of the device information 300-304. For example, in some embodiments, a device 114-118 may compute a unique hash of a user specified identifier for a device and transmit the hash value to the trusted service 102 for use in connection with identifying the device 114-118. In certain embodiments, device identifiers transmitted to the trusted service 102 may be maintained as part of a device list 306 managed by the trusted service 102.

The device information 300-304 may further comprise hardware and/or software specifications and/or characteristics of the associated devices 114-118. For example, the device information 300-304 may comprise, without limitation, information relating to one or more of a device CPU type, CPU performance, a number of processing cores, device processing speed(s), device memory, device network communication speeds, device operating systems and/or environments, whether a device possesses a secure processing unit, operating environment, and/or a policy-managed operating environment, whether a device possess certain specified software applications and/or features, and/or any other device hardware and/or software characteristic and/or specification. In certain embodiments, the hardware and/or software specifications and/or characteristics of the devices 114-118 may not necessarily represent all hardware and/or software resources associated with the devices 114-118, but instead may represent to the trusted service 102 the hardware and/or software resources that the devices 114-118 may wish to make available for use by the trusted service 102 (e.g., a subset of the associated hardware and/or software resources and/or the like).

The device information 300-304 may further comprise information relating to the current availability of hardware and/software resources of the devices 114-118. For example, in some embodiments, the device information 300-304 may comprise, without limitation, information relating to one or more of processor availably and/or use rate, available device memory, device network communication traffic conditions, and/or the like.

In further embodiments, the device information 300-304 may comprise device usage information that may include current and/or previous device hardware and/or software resource. Consistent with embodiments disclosed herein, device usage information may be used by the trusted service 102 to, among other things, predict future device resource utilization based on prior device resource utilization patterns, schedule and/or price the usage of device hardware and/or software utilizations for distributed computation and/or processing by third parties based on predicted device resource utilization, generate and allocate computational and/or processing tasks and/or operations to available connected devices 114-118, and/or the like.

In some embodiments, the device information 300-304 may be communicated to the trusted service 102 periodically. In other embodiments, the device information 300-304 may be communicated to the trusted service 102 based on the occurrence of certain events on the connected devices 114-118 (e.g., following a connected device entering a standby and/or idle state or the like). Device information 300-304 transmitted to the trusted service 102 from the devices 114-118 may be included in device resource information 308 managed by the trusted service 102.

As discussed above, certain aspects of the received device information 300-304 may be anonymized by the devices 114-118 prior to transmission to the trusted service 102. For example, the device information 300-304 may be filtered and/or otherwise operated on in a manner such that a recipient of the device information 300-304 may not identify a unique user and/or entity associated with the devices 114-118. In further embodiments, the trusted service 102 may anonymize the device information 300-304 prior to presenting the information to third parties (e.g., untrusted third parties) and/or outside a protected processing environment.

In certain embodiments, device information 300-304 may be generated and transmitted by the trusted service 102 from one or more other service systems (not shown) associated with the various connected devices 114-118. For example, a service provider system may receive various device information 300-304 from a connected device 114-118 as part of normal device operations (e.g., a connected thermostat 114 may provide an associated service provider system with period status updates and/or the like). Device information 300-304 may be shared with the trusted service 102 by such a service provider system for use in connection with embodiments of the disclosed systems and methods.

Based on the received device information 300-304, the trusted service 102 may categorize the connected devices 114-118 into one or more groups (e.g., using a computational management engine 312 executing thereon). As an example, the trusted service 102 may maintain and/or update device resource information 308 that includes some or all of the following information:

| Device Category | CPU Type | CPU Use Rate | Available Memory | Associated Devices |
|---|---|---|---|---|
| Category 1 | High Performance | Low | Large | Smartphone ID 123 Laptop ID 234 |
| Category 2 | High Performance | Medium | Medium | Appliance ID 345 Smoke Detector ID 456 |

The trusted service 102 and/or the associated computational management engine 312 executing thereon may generate and/or allocate computational and/or processing tasks and/or operations to one or more of the available connected devices 114-118 based, at least in part, on the device information 300-304. For example, as discussed in more detail below, the trusted service 102 and/or the computation management engine 312 may generate a plurality of computational tasks and distribute such tasks to associated connected devices 114-118 as part of computational requests issued to the devices 114-118.

In some embodiments, requests may be issued to particular connected devices 114-118 based on various device specifications and characteristics and/or the current availability of the devices 114-118, as reflected in received device information 300-304 and/or associated categories. For example, requests that involve more computationally intensive operations may be issued to connected devices 114-118 with greater processing resources. Similarly, requests that involve less computationally intensive operations may be issued to connected devices 114-118 with lesser processing resources. In this manner, requests may be tailored relative to the available resources of a connected device 114-118.

In certain embodiments, requests may be issued by the trusted service 102 and/or the computation management engine 312 based, at least in part, on predicted and/or otherwise anticipated device software and/or hardware utilization and/or availability at a future time. In some embodiments, future device software and/or hardware utilization and/or availability may be determined based on device information 300-304 received by the trusted service 102. For example, a device availability analysis module 310 executing on the trusted service 102 may be configured to, among other things, analyze received device information 300-304 to identify prior device resource utilization patterns and/or predict future device utilization based on past device resource utilization patterns. For example, based on analyzing prior device resource utilization patterns (e.g., using machine learning methods and/or the like), the device availability analysis module 310 may determine that a device 114-118 typically enters a standby and/or idle state during evening hours. In certain embodiments, the device availability analysis module 310 may provide an associated relative probability and/or a likelihood that a resource will be available at a future time. Based on this determination by the device availability analysis module 310, the computation management engine 312 may schedule computations to be performed by the device 114-118 and/or issue requests associated with the same during evening hours when the device 114-118 is more likely to be in a standby and/or idle state.

In certain embodiments, the trusted service 102 may facilitate a device resource marketplace, enabling one or more third party systems and/or devices to purchase and/or bid for the use of various hardware and/or software resources of available connected devices 114-118. For example, in some embodiments, a resource compensation management engine 312 executing on the trusted service 102 may coordinate with other modules and/or engines of the trusted service 102 to allow third parties to purchase and/or bid on the use of various hardware and/or software resources of available connected devices 114-118 for performing compensations and/or operations specified by third parties.

In connection with implementing a device resource marketplace, the resource compensation management engine 312 may, among other things, provide third parties with an indication of various available device software and/or hardware resources (e.g., current and/or future actual or anticipated available resources), receive payment and/or bids for access to and/or the use of available resources, implement a transaction and/or auction engine to process payments and/or bids, receive computations and/or operations from third parties to be performed by various connected devices 114-118, and/or interact with the computation management engine 312 in connection with coordinating performance of the computations and/or operations by the various connected devices 114-118.

In certain embodiments, device resources may be priced and/or auctioned by the resource compensation management engine 314 based on the relative likelihood of their availability at a future time. For example, hardware and/or software resources of a device 114-118 that are relatively likely to be available at a particular time based on analysis of past device resource utilization may be priced lower than hardware and/or software resources of a device 114-118 that are less likely to be available. Similarly, device resources may be priced and/or auctioned by the resource compensation management engine 314 based on the specifications, characteristics, and/or associated categories of the devices 114-118. For example, use of available resources of connected devices 114-118 having relatively greater processing capability may be priced higher than use of available resources of connected devices 114-118 having relatively less processing capability.

As discussed in more detail below, after performing assigned computations and/or operations in accordance with received requests, the connected devices 114-118 may return associated responses and/or results to the trusted service 102. In this manner, the trusted service 102 may use available resources of the connected devices 114-118 in connection with performing relatively complex distributed computations and/or processing operations in an effective and/or efficient manner.

Figure 4:
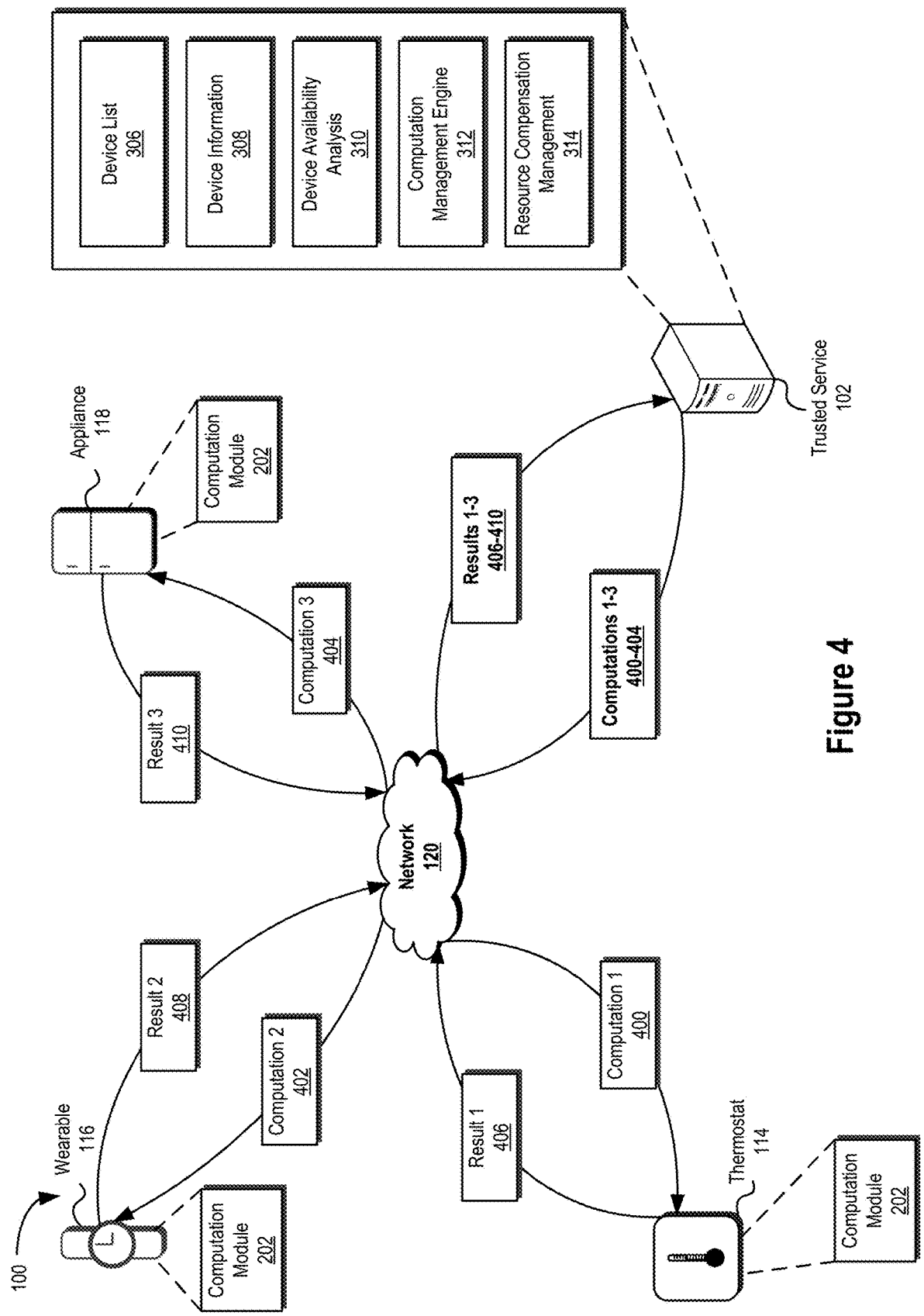
FIG. 4 illustrates an exemplary processing operation using a connected device ecosystem consistent with embodiments of the present disclosure.

FIG. 4 illustrates an exemplary processing operation using a connected device ecosystem 100 consistent with embodiments of the present disclosure. As illustrated, the trusted service 102 may distribute one or more operations and/or computation requests 400-404 to various connected devices 114-118. In certain embodiments, the operation and/or computation requests 400-404 may be generated by the computation management engine 312 based, at least in part, on device information 308 managed by the trusted service 102.

In some embodiments, the operations and/or computations associated with the requests 400-404 may be comprises steps, sub-computations and/or sub-operations, and/or sub-tasks associated with a computation, operation, and/or task. For example, in a multi-step computation, each of requests 400-404 may comprise a request for an associated connected device 114-118 to perform a step of the multi-step computation. In another example, in a computation comprising parallel computational steps, each of requests 400-404 may comprise a request for an associated connected device 114-118 to perform a step of the parallel computation. It will be appreciated that a variety of methods may be used to divide an operation and/or computation into constituent steps and/or associated requests 400-404 issued to connected devices 114-118, and that any suitable method may be used to generate associated computational requests 400-404 to issue to connected devices 114-118.

In certain embodiments, an operation and/or computation may be divided into constituent steps and/or associated requests 400-404 using methods similar to those used in connection with multi-core computer processing to allocate processing tasks between multiple processing cores. For example, in some embodiments, instruction-level parallelism, task parallelism, and data parallelism principles may be used in connection with dividing an operation and/or computation tasks into constituent steps and/or associated requests 400-404 issued to various connected devices 114-118.

In further embodiments, an operation and/or computation may be divided into constituent operations and/or computations associated with issued requests 400-404 based, at least in part, on various hardware and/or software specifications and/or characteristics of available devices 114-118. For example, if the devices 114-118 have relatively significant available processing resources, an operation and/or computation may be divided into relatively computationally intensive steps, sub-computations and/or sub-operations, and/or sub-tasks. In certain embodiments, this may result in fewer requests 400-404 being issued to the devices 114-118. If the devices 114-118 have relatively limited available processing resources, however, an operation and/or computation may be divided into relatively simpler computational steps, sub-computations and/or sub-operations, and/or sub-tasks, which may result in more requests 400-404 being issued to the devices 114-118.

In certain embodiments, requests 400-404 may comprise information used in connection with the steps, sub-computations, sub-operations and/or sub-tasks specified by the requests 400-404. For example, a request 400-404 may comprise information operated on in connection with a computation specified by the request 400-404. In further embodiments, a request 400-404 may indicate a location of information operated on in connection with a computation specified by the request 400-404, that may be used by an associated device 114-118 to access the information, and/or information that may be used to facilitate access to the information (e.g., access keys and/or the like).

Requests 400-404 received by the devices 114-118 may be processed by computation modules 202 executing on the devices 114-118. For example, in some embodiments, upon receipt of the requests 400-404 from the trusted service 102, computation modules 202 executing on the devices 114-118 may perform the computations and/or operations specified by the requests 400-404. In certain embodiments, the computation modules 202 and/or the computations and/or operations specified by the requests 400-404 may be executed in a secure execution space and/or a protected processing environment. For example, in some embodiments, upon receipt of the requests 400-404, the computation modules 202 and/or associated devices 114-118 may initialize a secure execution environment for performing the computations and/or operations specified by the requests 400-404.

In certain embodiments, executing computations and/or operations specified by the requests 400-404 in a protected and/otherwise managed execution space and/or environment may, among other things, protect the security and/or privacy of other information stored on the device 114-118 (e.g., personal information or the like) and/or the devices 114-118 themselves, protect the security and/or privacy of the computations and/or operations specified by the requests 400-404, and/or protect the security and/or privacy of information operated on when executing the computations and/or operations specified by the requests 400-404. In this manner, interests of various stakeholders in the illustrated ecosystem including device owners, parties specifying computations and/or operations as part of issued requests 400-404, and/or stakeholders of information operated on in connection with executing the requests 400-404 may be protected.

As discussed in more detail below, after performing assigned computations and/or operations in accordance with received requests 400-404, the connected devices 114-118 may return associated responses and/or results 406-410 to the trusted service 102. Based on the received results 406-410, the trusted service 102 and/or the associated computation management engine 312 may generate further computation and/or operational requests for distribution to various connected devices 114-118 and/or may use the received results 406-410 to generate a final computational result for returning to the third party that initiated the request. In this manner, the trusted service 102 may use available resources of the connected devices 114-118 in connection with performing relatively complex distributed computations and/or processing operations.

Various aspects of the disclosed systems and methods may be policy-managed to protect the security of various stakeholders and/or the integrity and privacy of associated data. For example, as discussed above, devices 114-118 and/or the trusted service 102 may anonymize device information prior to transmitting the information to the trusted service 102 and/or presenting the information to third parties. Similarly, requests 400-404 issued to devices 114-118 by the trusted service 102 may further be anonymized to protect the identity of a third party requesting the associated computation and/or operation. In certain embodiments, such anonymization may be specified by policies enforced by the devices 114-118 and/or the trusted service 102.

Policies specified by various stakeholders and enforced by the devices 114-118, services 102, and/or associated systems may articulate, among other things, requirements relating to the usage of the devices 114-118 and/or the services 102, the types of computations and/or operations that may be performed by the devices 114-118 and/or the services 102, the manner in which various information used by the devices 114-118 and/or the services 102 should be processed and/or handled by the devices 114-118 and/or services 102 (e.g., device information, requests 400-404, results 406-410, information used in connection with performing computations, etc.), various security requirements (e.g., signature requirements, information anonymization and/or filtering requirements etc.), and/or the like.

For example, a policy may specify that a trusted service 102 may only send requests for a certain computation to be performed by a trusted device 114-118 having a specified level of secure hardware and/or software resources. In another example, a policy may specify that information is handled in such a way so that a device 114-118 may not be aware of personal information being operated on in connection with executing a computation and/or the nature of a computation being coordinated by the trusted service 102 involving the device 114-118. In some embodiments, this may not only preserve the anonymity of individuals associated with the personal information, but may also operate to preserve the privacy of a third party that requested the computation be performed. Policies implemented by the various systems and devices 102, 114-118 may further specify that device information, requests, results, and/or any other information and/or communications between the systems and devices 102, 114-118 should be trusted and/or otherwise associated with an indicia of trust (e.g., a secure digital signature, a certificate from a trusted authority, and/or the like.).

In another example, policies may implement differential privacy protection between various connected devices 114-118. For example, a policy may specify that a trusted service 102 may only send requests for certain computations to be performed by trusted devices 114-118 located in certain geolocations, based prior device performance, and/or the like. In further embodiments, policies may differentiate between devices 114-118 based on relative degrees of trust of the devices. For example, when allocating an operation and/or computation, the trusted service 102 may allocate less sensitive sub-computations to less trusted devices 114-118 and/or allocate more sensitive sub-computations to more trusted devices 114-118. Similarly, the trusted service 102 may implement strong obfuscation and/or other software protected techniques when allocating sub-computations to less trusted devices 114-118 than when allocating sub-computations to more trusted devices 114-118. In further embodiments, the trusted service 102 may introduce increased obfuscation (e.g., noise) to information sent in connection with computations allocated with less trusted devices 114-118 relative to that sent to more trusted devices 114-118.

In a further example, a policy may specify that a computation be divided into sub-computations in a manner that addresses various applicable stakeholder privacy concerns. For example, a computation may be divided into sub-computations in a manner such that individual connected devices 114-118 performing the sub-computations may not be aware of the greater computation. In some embodiments, computations may be divided in a manner that reduces the likelihood of successful collusion by connected devices 114-118 in determining aspects of a greater computation. It will be appreciated that a variety of policies may be articulated and/or enforced in connection with the disclosed embodiments, and that any suitable types of policies may be used in connection with the disclosed systems and methods.

Embodiments of the disclosed systems and methods may be used in a variety of computations and/or operations. For example, embodiments of the disclosed systems and methods may be used in connection with complex computations involving genomic and/or bioinformatic investigations (e.g., protein analysis), model-based studies including earth science modeling (e.g., atmospheric and/or weather modeling and forecasting) pattern analysis, cryptographic operations, and/or the like. It will be appreciated that a variety of suitable computations and/or operations may be implemented using embodiments of the disclosed systems and methods.

In at least one example, a trusted service 102 may wish to engage in a cryptocurrency mining operation such as a Bitcoin mining operation. In connection with such an operation, to generate an associated proof-of-work, a processing operation configured to discover a specific nonce value which enables a block hash (e.g., by SHA-256) to have a certain sequence of values (e.g., 0 values) and the head of its value may be performed. In at least one example, a nonce length of 8 bytes may be used in connection with a cryptocurrency mining operation that can be expressed with integer numbers. The trusted service 102 may define several ranges of integer values, such as, for example:

Range 100M-1: 0-100M

Range 100M-2: 100M-200M
Range 10M-1: 200M-210M
Range 10M-2: 210M-220M

The trusted service 102 may generate and issue associated computation requests 400-404 based, at least in part, on available status and/or device information for the connected devices 114-118 and/or associated device categories. For example, the trusted service 102 may assign operations and issue associated requests 400-404 as follows:

Range 100M-1: Smartphone (Category 1)
Range 100M-2: Laptop (Category 1)
Range 10M-1: Appliance 118 (Category 2)
Range 10M-2: Thermostat 114 (Category 2)

In certain embodiments, computational requests 400-404 issued by the trusted service 102 to the one or more associated connected devices 114-118 may be signed by the trusted service 102. For example, requests 400-404 may be signed using a key of the trusted service 102. In some embodiments, this may allow the connected devices 114-118 to authenticate the issuer of a computational request 400-404 based on the results of a signature verification operation.

Upon receipt of a computational request 400-404, a connected device 114-118 may verify a signature associated with the request, and execute the task if the computational and/or processing resources of the device remain available. If the computational and/or processing resources are not available at the time the request is received, the connected device 114-118 may inform the trusted service 102 so that the trusted service 102 can allocate the task to another connected device 114-118 (e.g., another connected device in the same category and/or having similar available hardware and/or software resources).

In some embodiments, computation requests 400-404 may be assigned to connected devices 114-118 according to an associated priority. For example, the trusted service 102 may assign a task to a connected device 114-118 in a first category as a first choice if available, and also assign the task to a connected device in a second category as a second choice in the event a connected device in the first category is not available. In certain embodiments, tasks may be associated with a relative priority and be assigned to devices 114-118 based on the relative characteristics and/or specifications of the devices 114-118. For example, higher priority tasks may be assigned to devices 114-118 with relatively greater available processing resources and lower priority tasks may be assigned to devices 114-118 with relatively fewer available processing resources. In further embodiments, tasks associated with a particular priority may be assigned to devices 114-118 based on the likelihood of their future availability. For example, higher priority tasks may be assigned to devices 114-118 that are more likely to be available a particular time and lower priority tasks may be assigned to devices 114-118 that are less likely to be available at a particular time In certain embodiments, as a connected device 114-118 may only be assigned to perform a task representing a portion of a larger computation and/or operation, the specific nature of the associated larger computation and/or operation and/or secure information associated with the same may not necessarily be readily apparent to the connected device 114-118. In certain embodiments, this may allow certain trusted operations to be performed while reducing the potential that certain secure information is compromised in connection with the overall computation and/or operation.

If a resource of a connected device 114-118 becomes unavailable while performing an associated computation (e.g., a user wakes up in the middle of the night and starts using their smartphone), the device 114-118 may terminate the task assigned by the trusted service 102. Intermediate results of the task and/or an indication that the task was terminated may be communicated to the trusted service 102, and remaining portions of the task may be assigned to other available connected devices 114-118.

The trusted service 102 may receive various results 406-410 of tasks performed by associated connected devices, and may assemble the results in connection with the overall computation and/or operation. In the above example of a cryptocurrency mining operation, for example, the trusted service 102 may receive the following results:

Hash value not matched: Range 100M-1: Smartphone (Category 1)
Hash value not matched: Range 100M-2: Laptop (Category 1)
Hash value not matched: Range 10M-1: Appliance 118 (Category 2)
Hash value matched with XYZ: Range 10M-2: Thermostat 114 (Category 2)

In some embodiments, owners of various connected devices 114-118 may be compensated for making available the resources of their devices to the trusted service 102 for use in connection with computations and/or processing operations. In some embodiments, owners may be compensated based on a relative contribution of their devices 114-118 to a computation and/or operation. For example, a device owner that performs more complex computations may be more highly compensated than a device owner that performs less complex computations. In further embodiments, device owners may be compensated based on specific results generated by their associated connected devices 114-118 (e.g., a matching hash value in a cryptocurrency mining operation or the like).

Figure 5:
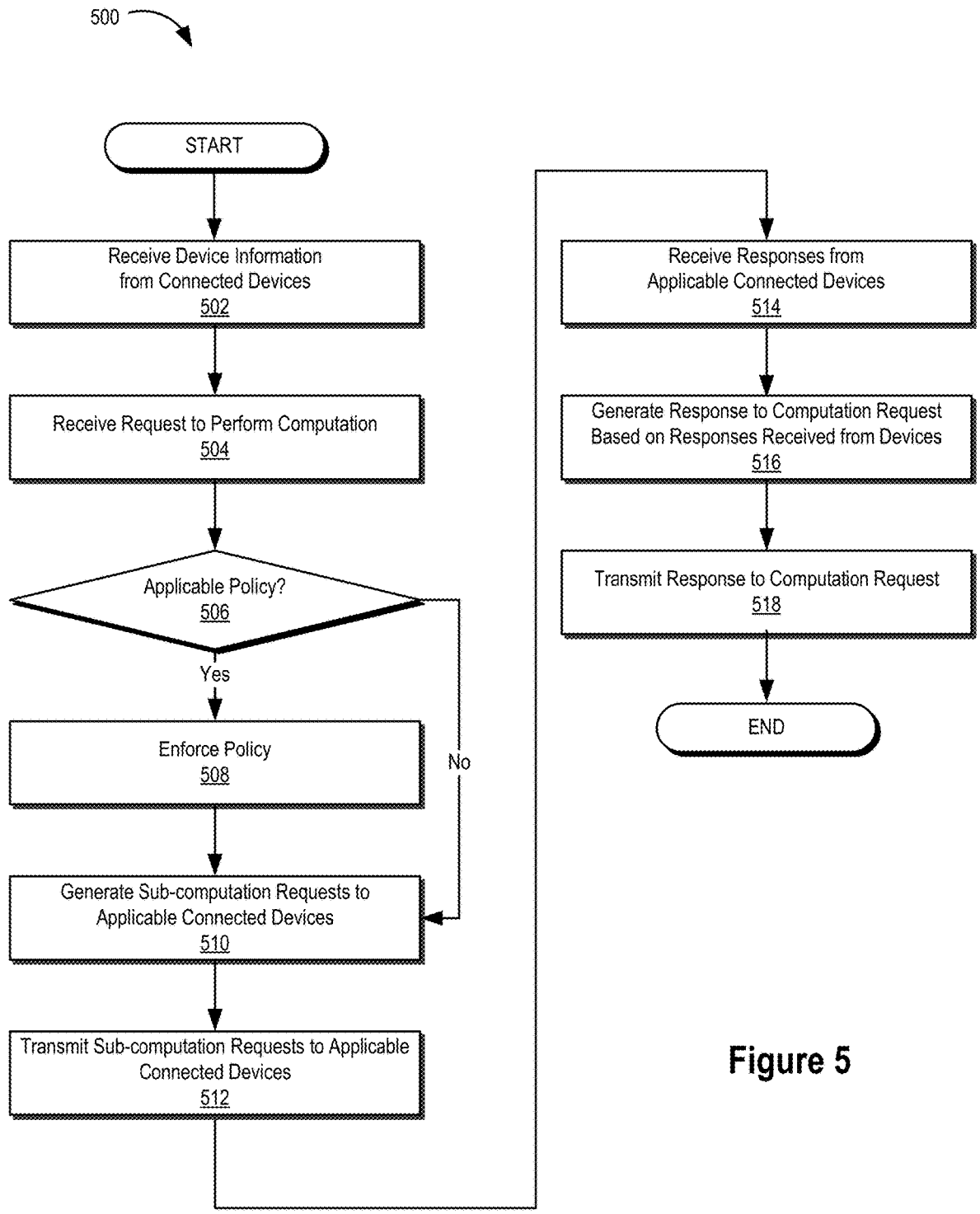
FIG. 5 illustrates a flow chart of an exemplary method for performing a processing operation consistent with embodiments of the present disclosure.

FIG. 5 illustrates a flow chart of an exemplary method 500 for performing a processing operation consistent with embodiments of the present disclosure. The illustrated method 500 may be implemented in a variety of ways, including using software, firmware, hardware, and/or any combination thereof. In certain embodiments, various aspects of the method and/or its constituent steps may be performed by a trusted service, one or more connected devices, and/or any other suitable system or combination of systems. In some embodiments, the illustrated method 500 may facilitate coordination of distributed computational and/or processing operations by a trusted service in communication with one or more connected devices.

At 502, device information may be received from a plurality of connected devices by a trusted service. In some embodiments, the device information may be provided to the trusted service by a user in connection with a device registration process. In further embodiments, the device information may be collected by a computation module and/or application executing o the respective devices. The device information may comprise, without limitation, one or more identifiers associated with the devices, hardware and/or software specifications and/or characteristics of the devices, information relating a current availability of hardware and/or software resources of the devices, device usage information providing an indication of current and/or previous device resource utilization, and/or information that may be used to forecast and/or otherwise predict future device resource utilization.

A request to perform a computation, operation, and/or task may be received by the trusted service at 504. In certain embodiments, the request may be received by the trusted service by one or more third parties interested in utilizing current and/or future available resources of the various connected devices in connection with performing the computation, operation, and/or task. In some embodiments, the trusted service may provide the one or more third parties with information relating to available connected devices (e.g., information that may be reflected in and/or derived from received device information such as, without limitation, available processing and/or hardware resources, device software specifications and/or execution environments, and/or the like). Based on this information, the third parties may identify that they wish to engage one or more of the available connected devices in connection with performing computation requests. As discussed above, in certain embodiments, third parties may interact with a marketplace and/or an auction engine in connection with purchasing and/or bidding on the opportunity to use available device resources.

Requests to perform computations, operations, and/or tasks may include, for example, a specified computation, operation, and/or task, information to be used and/or otherwise processed in connection with the specified computation, operation, and/or task, access locations of information to be used and/or otherwise processed in connection with the specified computation, operation, and/or task, and/or one or more policies. The policies may relate to, among other things, the information to be used and/or otherwise processed in connection with the specified computation, operation, and/or task, the manner in which the specified computation, operation, and/or task may be divided into constituent operations, hardware and/or software requirements of various connected devices that may be used to perform the specified computation, operation, and/or task, and/or the like. It will be appreciated that a variety of policies may be used in connection with the disclosed method 500, including any of the policies described herein. Moreover, it will be appreciated that policies used in connection with the disclosed embodiments may be specified and/or provided in conjunction with computations from third parties, specified by the connected devices and/or entities associated with the same, specified by stakeholders of information to be processed in connection with a requested computation, and/or by any other relevant stakeholder.

At 506, a determination may be made by the trusted service regarding whether there are any applicable policies associated with the request received at 504. Identified policies may be enforced by the trusted service at 508 in connection with generating sub-computation requests for applicable connected devices at 510. For example, a policy may require that a computation be divided into constituent steps in a certain manner so that devices receiving associated sub-computations may not be able to readily ascertain the overall computation request received at 504. Similarly, a policy may require that only a threshold amount of information used in connection with a computation be disclosed to a single connected device, and requests may be generated at 510 that conform with such a requirement.

If there are no applicable policies identified at 506, the method 500 may proceed to 510 where sub-computation requests may be generated for applicable connected devices without any policy being enforced by the trusted system.

At 512, the trusted service may transmit the generated sub-computation requests to one or more available connected devices. In certain embodiments, the sub-computation requests may be generated and transmitted to a subset of the plurality of connected devices providing the trusted service with associated device information at 502. For example, in some embodiments, requests may only be sent to devices of the plurality of devices meeting certain hardware and/or software security requirements, as may be specified by applicable policies identified at 506.

Responses and/or results to the sub-computation requests generated by the various connected devices may be received by the trusted service at 514. Based on the received responses and/or results to the sub-computation requests, the trusted service may generate a response at 516 to the computation request received at 504. The generated response to the computation request may be transmitted to a requesting system and/or third party at 518.

It will be appreciated that a number of variations can be made to the method 500 presented in connection with FIG. 5 within the scope of the inventive body of work. For example, in certain embodiments, various steps of the method 500 may be implemented by connected devices (e.g., policy enforcement) in lieu of and/or in addition to the trusted service. Thus it will be appreciated that FIG. 5 is provided for purposes of illustration and explanation, and not limitation.

Figure 6:
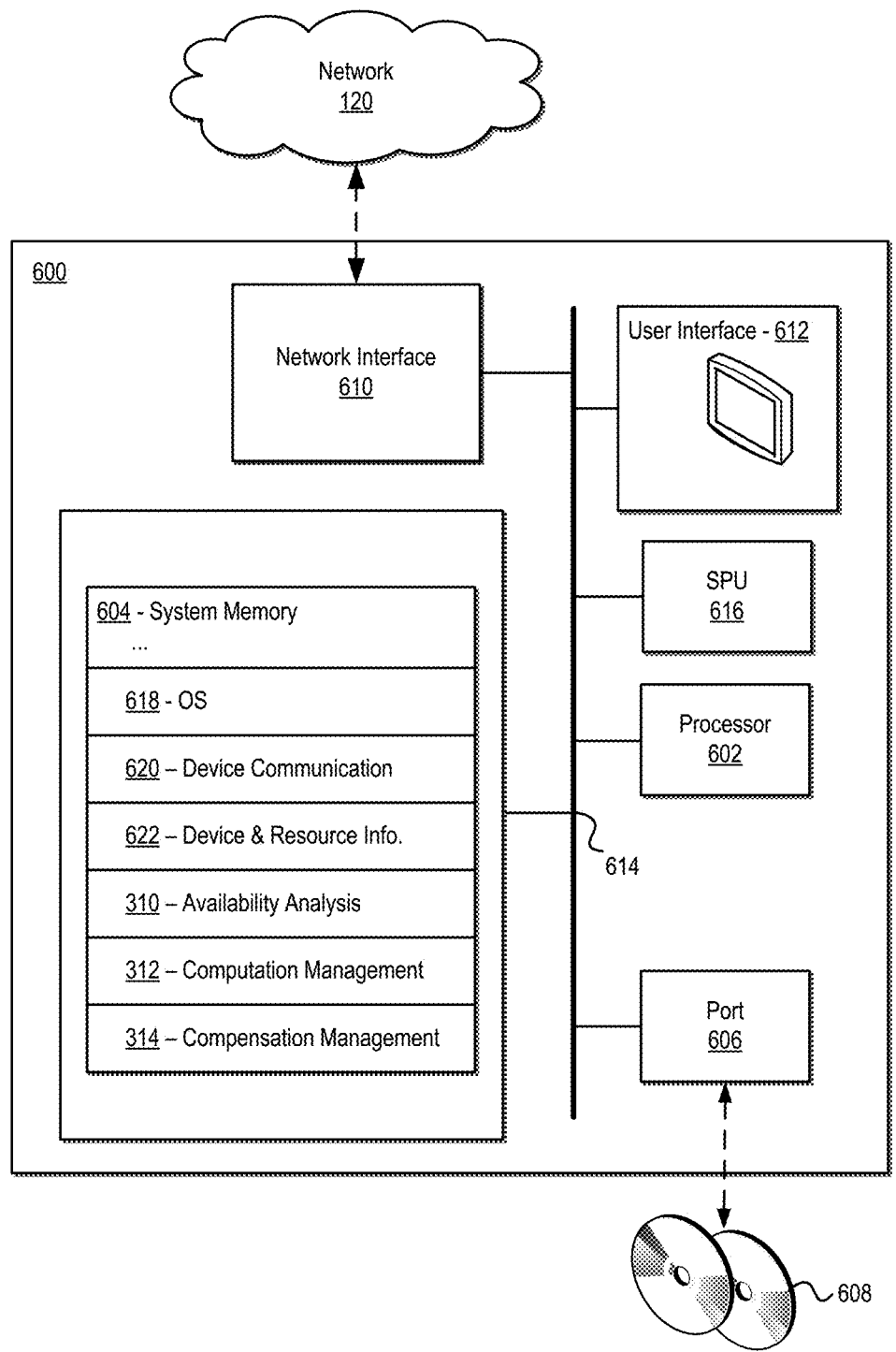
FIG. 6 illustrates an exemplary system that may be used to implement embodiments of the systems and methods of the present disclosure.

FIG. 6 illustrates an exemplary system 600 that may be used to implement embodiments of the systems and methods of the present disclosure. Certain elements associated with the illustrated exemplary system 600 may be included in one or more trusted services, connected devices, and/or any other system configured to implement various aspects of embodiments of the disclosed systems and methods. As illustrated in FIG. 6, the system 600 may include: a processing unit 602; system memory 604, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 602; a port 606 for interfacing with removable memory 608 that may include one or more diskettes, optical storage mediums, and/or other non-transitory computer-readable storage mediums (e.g., flash memory, thumb drives, USB dongles, compact discs, DVDs, etc.); a network interface 610 for communicating with other systems via one or more network connections 120 using one or more communication technologies; a user interface 612 that may include a display and/or one or more input/output devices such as, for example, a touchscreen, a keyboard, a mouse, a track pad, and the like; and one or more busses 614 for communicatively coupling the elements of the system.

In some embodiments, the system may, alternatively or in addition, include an SPU 616 that is protected from tampering by a user of the system or other entities by utilizing secure physical and/or virtual security techniques. An SPU 616 can help enhance the security of sensitive operations such as personal information management, trusted credential and/or key management, privacy and policy management, and other aspects of the systems and methods disclosed herein. In certain embodiments, the SPU 616 may operate in a logically secure processing domain and be configured to protect and operate on secret information, as described herein. In some embodiments, the SPU 616 may include internal memory storing executable instructions or programs configured to enable the SPU 616 to perform secure operations, as described herein.

The operation of the system 600 may be generally controlled by the processing unit 602 and/or the SPU 616 operating by executing software instructions and programs stored in the system memory 604 (and/or other computer-readable media, such as removable memory 608). The system memory 604 may store a variety of executable programs or modules for controlling the operation of the system. For example, the system memory may include an operating system ("OS") 618 that may manage and coordinate, at least in part, system hardware resources and provide for common services for execution of various applications and a trust and privacy management system for implementing trust and privacy management functionality including protection and/or management of sensitive data through management and/or enforcement of associated policies. The system memory may further include, without limitation, communication software 620 configured to enable in part communication with and by the system; one or more applications; device and resource information 622; a device availability analysis module 310 for analyzing device information to identify prior device resource utilization patterns and/or predict future device utilization; a computation management engine 312 for generating and/or allocating computational and/or processing tasks and/or operations to one or more available connected devices; a compensation management engine 314 for pricing, auctioning, and/or facilitating the sale of available device resources; and/or any other information, modules, and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for managing a computation performed by a trusted system comprising a processor and a non-transitory computer-readable medium storing instructions that, when executed by the processor, cause the processor to perform the method, the method comprising:
   receiving, from a plurality of connected devices, device information, the device information comprising an indication of at least one resource associated with each device of the plurality of connected devices, an indication of an availability of the at least one resource, and an indication of a network connection status of the at least one resource;
   determining, based on the indication of the prior availability of the at least one resource, a predicted future availability of the at least one resource;
   receiving from a user a request to perform a computation, wherein the request to perform the computation comprises at least one associated policy;
   generating, based on the received request, at least part of the received device information, and the determined predicted future availability, a plurality of sub-computation requests, each sub-computation request of the plurality of sub-computation requests comprising an indication of a sub-computation to be performed by a connected device of the plurality of connected devices, wherein generating the plurality of sub-computation requests is further based on the associated policy;
   sending each sub-computation request of the plurality of sub-computation requests to at least one device of the plurality of connected devices;
   receiving a plurality of responses to the sub-computation requests, each of the plurality of responses to the sub-computation requests comprising a result of the sub-computation performed by the associated device of the plurality of connected devices;
   generating a result of the computation based on the plurality of responses to the sub-computation requests; and
   sending to the user the result of the computation.

2. The method of claim 1, wherein the plurality of sub-computation requests are sent to a subset of connected devices of the plurality of connected devices, the subset of connected devices being identified based on the received device information.

3. The method of claim 1, wherein the indication of an availability of the at least one resource comprises an indication of a current availability of the at least one resource.

4. The method of claim 1, wherein each sub-computation request of the plurality of sub-computation requests comprises an indication of a time that the sub-computation should be performed by a respective connected device, the time being determined based on the indication of the prior availability.

5. The method of claim 1, wherein the indication of an availability of the at least one resource comprises an indication of whether each device of the plurality of connected devices is in at least one of a standby and an idle state.

6. The method of claim 1, wherein each sub-computation request of the plurality of sub-computation requests further comprises information to be operated on in connection with the associated sub-computation.

7. The method of claim 1, wherein each sub-computation request of the plurality of sub-computation requests further comprises a location to access information to be operated on in connection with the associated sub-computation.

8. The method of claim 1, wherein the associated policy comprises at least one specified hardware requirement of a connected device.

9. The method of claim 8, wherein each generated sub-computation request of the plurality of sub-computation requests are sent to a subset of connected devices of the plurality of connected devices, each connected device of the subset of connected devices meeting the specified hardware requirement of the associated policy.

10. The method of claim 1, wherein the associated policy comprises at least one software requirement of a connected device.

11. The method of claim 10, wherein each generated sub-computation request of the plurality of sub-computation requests are sent to a subset of connected devices of the plurality of connected devices, each connected device of the subset of connected devices meeting the specified software requirement of the associated policy.

12. The method of claim 1, wherein the associated policy specifies the manner in which the computation may be divided into sub-computations, and wherein generating the plurality of sub-computations requests further comprises generating the plurality of sub-computation requests in the manner specified by the associated policy.

13. The method of claim 1, wherein at least on device of the plurality of connected devices comprises a connected thermostat.

14. The method of claim 1, wherein at least one device of the plurality of connected devices comprises a connected appliance.

15. The method of claim 1, wherein at least one device of the plurality of connected devices comprises a smartphone.

* * * * *